UNITED STATES PATENT OFFICE.

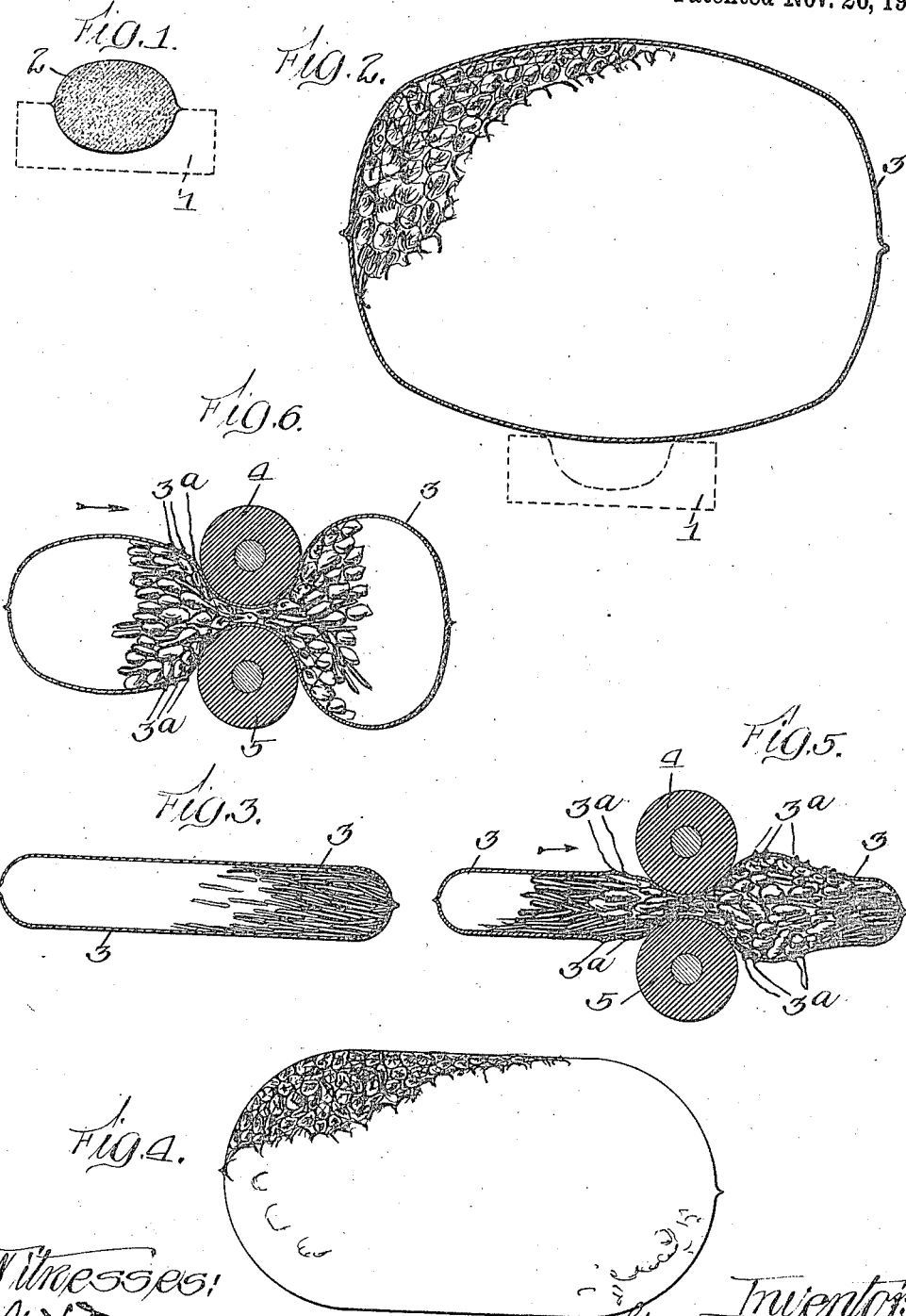

GLENN H. WILLIS AND BENJAMIN F. FELIX, OF CHICAGO, ILLINOIS, ASSIGNORS TO FEATHERWEIGHT RUBBER SPONGE COMPANY, OF CHICAGO, ILLINOIS, A CORPORATION OF ILLINOIS.

PROCESS OF MAKING ARTIFICIAL SPONGE.

1,045,234.  Specification of Letters Patent.  Patented Nov. 26, 1912.

Application filed February 4, 1907. Serial No. 355,611.

*To all whom it may concern:*

Be it known that we, GLENN H. WILLIS and BENJAMIN F. FELIX, citizens of the United States, residing at Chicago, in the county of Cook and State of Illinois, have invented certain new and useful Improvements in Processes of Making Artificial Sponge, of which the following is a full, clear, and exact specification.

The invention relates to artificial sponges; and the primary object of the invention is to provide an improved method of producing an artificial sponge possessing to a superior degree the qualities of porosity, elasticity, pliability, and capability for the ready absorption of liquids.

A further object of the invention is to provide an improved method of producing artificial sponge, having an intercellular body possessing in the maximum degree the power of absorbing and holding liquids.

To the attainment of these ends and the accomplishment of other new and useful objects, as will appear, the invention consists in the features of novelty in the processes hereinafter more fully described and claimed, and illustrated to an extent in the accompanying drawings, in which certain features of the preferred methods employed in practising the invention are illustrated, as will appear by the references hereinafter made to the various figures of the drawings.

In the preferred manner of practising the invention, the raw rubber compound, as commonly sold on the market, is first thoroughly worked or mixed in a manner well known. During this working or mixing process, it is also common to introduce any desired coloring matter. Before this process of working or mixing of the compound is completed, the mixture should be thoroughly impregnated with any of the well known materials which are adapted to become gaseous upon the application of heat, which is commonly applied in curing rubber. These materials are commonly applied to the mixture in liquid or granulated form, the granules of the material being very finely pulverized when the material in the solid form is used in order that the particles adapted to become gaseous may become very thoroughly mixed throughout the compound. The introduction of such materials into the compound and the mixing and coloring as described, are well known to those versed in the art, and has been commonly practised heretofore in the production of various forms of dry cured sponge rubber, which is a common commercial article.

In practising the invention for producing the toilet sponge, a quantity of the mixed compound is molded into the form approximating the desired shape of the completed article. These individual portions of the material may be molded in any convenient manner, as, for example, a convenient form may be employed in giving the mass the desired shape, as illustrated in Figure 1, in which the member or receptacle 1 shown in dotted lines indicates one-half of the mold, the top portion being removed while the remaining part 1 is used to hold the molded portions of the mixture when inserted into the curing oven. The part designated by the reference numeral 2 illustrates a cross-section of the material ready for insertion into the curing oven. It will be observed that an attempt has been made to illustrate the gas producing material with which the mixture is thoroughly impregnated, as described, by the strippling appearing throughout the section 2. The curing oven should be so constructed that live steam may be admitted to the interior thereof and in contact with the material to be cured. The curing is accomplished by closing and sealing the oven or curing receptacle and admitting steam until the material is sufficiently cured. The time required for curing will, of course, vary according to the amount of pressure applied. Heretofore, as already explained, it has been the practice to cure the material prepared as described, by what is known as the dry process; that is, the steam is not admitted into the interior of the oven or curing receptacle, but the material is cured by being placed on heated plates or in an oven heated from the exterior without the introduction of steam.

Fig. 2 of the drawing is a view similar to Fig. 1 illustrating the material after curing and as it comes immediately from the curing oven. It will be observed that the action of the steam and heat in curing the mixture has caused the gas producing material to gasify and so expand to a size many times its original proportions.

In practising the invention it is found that the depression in the receptacle 1, which receives the material should have its sides so shaped as to readily permit the egress of the material from the receptacle during the process of expansion, for if the material be confined and so prevented from expanding in any direction during the curing process, irregularity in the cellular structure will result. The action of the steam in the curing oven also has the effect of forming a tough skin or covering around the exterior of the article as illustrated by the reference numeral 3 in Fig. 2. When the cured portions appearing as in Fig. 2 are removed from the oven, they cool very rapidly in coming into contact with the atmosphere, causing contraction of the gas within the cellular structure and consequent collapse of the material. This is illustrated in Fig. 3, which shows a cross-section of the cured portion as it appears after cooling and contracting. In the common process of dry curing such material for the purpose of producing sponge rubber, the pressure of the gas punctures the wall of the cell, which is produced by its formation during the application of heat in curing and the gas passes off into the surrounding air in the oven after the manner of the escape of gases in the ordinary process of baking bread. In the present improved process, however, of curing the material under steam pressure, the gas is retained within the cell and is kept from bursting through the walls in the surrounding material by reason of the steam pressure within the curing oven. The contact of the steam with the material also forms the exterior coating or covering 3 already described, which assists in retaining the gas.

The illustration of the material after cooling upon being taken out of the oven, as it appears in Fig. 3, only approximates the condition of the material. The contraction of the cells gives the material a very shrunken and irregular appearance due to the partial vacuums formed in the multitude of cells by the contraction of the gases. The next step in the process is to break down the walls of the interior structure, thus relieving the vacuums created by the contraction of the gases and permitting the air to enter the interior of the structure, causing the material to assume its normal condition, which is practically the condition it assumes in the illustration in Fig. 2, although somewhat smaller in size than the relative size exhibited in Fig. 2 for the reason that Fig. 2 represents the material immediately after being taken from the oven and under these conditions before contraction of the gases begins, the article is expanded to a greater extent than when under the pressure of the steam in the curing oven.

The illustration in Fig. 4 has been drawn to represent approximately the relative size of the completed article after the cell walls are broken down. The cell walls may be broken down by puncturing them or forcing the gas from them in any convenient manner, as, for example, by passing needles through the material; but the most approved method of accomplishing this result is illustrated in Figs. 5 and 6, which consists in passing the material between closely confined rollers. The apparatus for accomplishing this purpose preferably consists of two rollers, as 4 and 5, and may have their surface covered with some suitable material, such as hard rubber as used on ordinary clothes wringers. It is also desirable that these rollers be held together by elastic pressure.

In Fig. 5 the material, as it appears in Fig. 3, is shown passing between the rollers in the direction indicated by the arrow. The material is repeatedly passed between the rollers in order to secure the complete breaking down of the cell walls. An attempt is made in Fig. 5 to illustrate the appearance of the material on its first passage through the rollers. It will be observed that the cell walls at the end of the material which was first to pass between the rollers do not show that they have been to any appreciable extent broken down, while the succeeding portions between the forward end and the position of the rollers in this illustration appear to be more broken. This is the manner the rollers act on the material, for the reason that when the material is first pinched or bit between the rollers, many of the cells will at first be unbroken but as the material progresses between the rollers the accumulations of the gas as it is crowded forward through the structure continues to increase and it will be seen that the breaking of a single cell will force the gas therefrom into the adjoining cell, thus increasing the gas within that cell and finally itself being forced into the adjoining cell. This process of forcing the gas from one cell to another through the interior structure is continued until the gas is forced to the outer surface and breaks through the outer covering or skin 3, as indicated at 3ª, Fig. 5. When the material is first passed between the rollers, it will be apparent that the process of breaking the walls will depend upon the pressure applied to the gas contained within the sealed walls. However, as the breaking down process continues and the material begins to expand, the air will enter from the exterior and being caught within the unbroken folds of the material by the action of the rollers, assists very materially in the further breaking down of the interior structure.

Fig. 6 illustrates a view of the breaking down process similar to Fig. 5, but showing material that has previously been passed between the rollers a number of times and discloses the fact that as the process of breaking down the cell walls continues, the material continues to increase in its dimensions, particularly in thickness until finally the cell walls are all punctured or broken down and the air admitted to the interior throughout the entire structure. It will be apparent that this breaking down of the interior structure or cell walls may readily be accomplished by a crushing or rocking process instead of the rollers, although, as stated, the use of the rollers is found to be the most satisfactory in practice as regards economy of time and the production of an entirely satisfactory quality of the material. In the breaking down of the cell walls by passing the material between the rollers it is found highly advantageous to vary the initial point of contact of the material with the rollers as the frequent changes of direction in which the material is attacked or compressed by the rollers results in a more thorough breaking down of the cell walls and consequently a better resulting quality of sponge material than if the material be presented to the rolls at each insertion in the same position. The final step in the production of the completed article consists in removing the exterior skin or covering 3. This may be done by the use of a knife or other convenient means, but the most satisfactory known method is to expose the surface of the sponge to a very sharp and rapidly rotating cutter by which means the skin or covering may be removed and the article shaped as desired.

Artificial sponge produced in the manner described possess to a superior degree the quality of ready absorption and subsequent retention of liquids for the reason that the cell walls being broken down after curing have a valvular action due to the tendency of the adjacent slit or torn edges to co-operate with each other and close or partially close when the interior structure becomes filled with liquid.

In order that the invention might be fully understood, the details of the preferred manner of practising it have been thus specifically described, but

What we claim is:

1. The herein described process of making artificial sponge, which consists in curing a compound consisting of a thorough intermixture of rubber and a material adapted to assume gaseous form at temperatures ordinarily employed in curing rubber, whereby contiguous closed cells are formed throughout the compound by subjecting the compound to heat for curing and at the same time preventing uniformly throughout the resulting substance the breaking down of the contiguous cell walls during the curing operation by the application of external pressure, and after curing and cooling mechanically breaking down the walls of the contiguous cells formed therein during the curing operation.

2. The herein described process of making artificial sponge, which consists in curing a compound of a thorough intermixture of rubber and a material adapted to assume gaseous form on the application of heat, whereby the resulting product becomes a cellular structure composed uniformly throughout of contiguous thin-walled closed cells, by subjecting the compound to the direct action of steam under pressure sufficient to counteract the tendency of the gases formed on the interior of the cells to break down the contiguous cell walls, and after cooling mechanically breaking down the walls of the contiguous cells formed during the curing operation to a degree whereby thorough intercommunication between contiguous cells is secured and the resulting material is rendered capable of the ready absorption of liquids.

3. The herein desecribed process of making artificial sponge which consists in curing a compound of rubber and a material adapted to assume gaseous form on the application of heat by subjecting the compound to the direct action of steam under pressure sufficient to prevent the escape of the gases generated during the curing operation, whereby the resulting product becomes a cellular structure composed uniformly throughout of contiguous thin-walled closed cells, and after permitting the cooling and contraction of the resulting substance, mechanically breaking down the walls of the contiguous cells formed during the curing operation by thoroughly tearing or slitting them whereby complete inter-communication between contiguous cells is secured and the resulting material is rendered capable of the ready absorption of liquids.

4. The herein described process of making artificial sponge which consists in curing a compound of rubber and a material adapted to assume gaseous form on the application of heat, by subjecting the compound to the direct action of steam under pressure, and after permitting the cooling and contraction of the resulting substance, breaking down the walls of the cells formed during the operation of curing, by subjecting it to the crushing action of closely confined rolls.

5. The herein described process of making artificial sponge which consists in curing a compound of rubber and a material adapted to assume gaseous form on the application of heat, by subjecting the compound to the direct action of steam under pressure; and after permitting the cooling and contraction of the resulting substance submitting it to a kneading or rolling process for the purpose of breaking down the cellular walls formed by the expansion of the gaseous material during the operation of curing.

6. The herein described process of making artificial sponge which consists in subjecting a cured compound of rubber and gaseous material having a plurality of closed gas retaining cells to a kneading or compressing process adapted to break down the said cell walls.

7. The herein described process of making artificial sponge which consists in subjecting a cured compound of rubber and gaseous material having a plurality of closed gas containing cells to the action of coöperating rollers for the purpose of breaking down the said cell walls.

8. The herein described process of making artificial sponge which consists in subjecting a material consisting of cured compound of rubber and gaseous material having a plurality of closed gas containing cells to the action of coöperating rollers, the said material being repeatedly passed between the rollers, the initial point of contact of the material with the rollers being varied at each succeeding passage to break down the cell walls.

9. The herein described process of making artificial sponge which consists in subjecting a material consisting of cured compound of rubber and gaseous material having a plurality of closed gas containing cells to the action of coöperating rollers, the said material being repeatedly passed between the rollers, and shifted after each passage to vary the initial point of engagement of the material with the rollers to break down the cell walls.

10. The herein described process of making artificial sponge which consists in curing a compound of rubber and a material adapted to assume gaseous form at temperatures ordinarily employed in curing rubber, by subjecting the compound under pressure to heat, and after curing breaking down the walls of cells formed during the operation of curing by subjecting the cured material to a kneading or compressing process.

11. The herein described process of making artificial sponge which consists in curing a compound of rubber and a material adapted to assume gaseous form at temperatures ordinarily employed in curing rubber, by subjecting the compound under pressure to heat, and after curing breaking down the walls of cells formed during the operation of curing by subjecting the cured material to the action of coöperating rollers.

12. The herein described process of making artificial sponge, which consists in curing a compound of rubber and a material adapted to assume gaseous form at temperatures ordinarily employed in curing rubber by subjecting the compound under confinement or pressure to heat whereby the breaking down of the cell walls prematurely and during the curing operation is prevented and after curing and cooling thoroughly tearing or slitting the cell walls by mechanical means whereby elongated openings or slits are formed in the cell walls uniformly throughout the resulting structure, thus establishing thorough valvular intercommunication between adjacent cells.

In testimony whereof we have signed our names to this specification, in the presence of two subscribing witnesses, on this 31st day of January, A. D. 1907.

GLENN H. WILLIS.
BENJAMIN F. FELIX.

Witnesses:
HARRY FIDLER,
BENJAMIN B. FELIX.